United States Patent Office 3,208,880
Patented Sept. 28, 1965

3,208,880
ALKALINE STORAGE BATTERY AND PROCESS
FOR MAKING THE SAME
Hans Bode, Frankfurt am Main, Germany, assignor to Varta Aktiengesellschaft, Frankfurt am Main, Germany
No Drawing. Filed Dec. 27, 1963, Ser. No. 334,043
11 Claims. (Cl. 136—24)

This application is a continuation-in-part of application Serial No. 50,092, now abandoned, filed August 17, 1960.

This invention relates to storage batteries of the alkaline type which function without apparent evolution of gas, as for example, those which are permanently and hermetically sealed. More particularly, the invention relates to storage batteries in which cadmium oxide and metallic zinc are incorporated in the negative electrode prior to sealing the battery. The incorporation of the metallic zinc in the negative electrode, prior to sealing, produces a discharge reserve in the negative electrode and thereby creates an electrical imbalance in favor of the negative electrode of the sealed battery.

Hermetically sealed storage battery cells have previously been made so that the negative electrode is in a higher state of charge than the positive electrode at the time the cell is sealed gas-tight. The negative electrode thereby possesses a so-called discharge reserve. This extra charge in the negative electrode makes the cell as a whole give better discharge behaviour, and in addition under certain conditions aids in preventing dangerous pressure build-up during over-discharge of the cell. This extra charge in the negative electrode has, in the past, generally been built into the cell by selective electrolytic treatment of the negative electrode prior to cell sealing. In storage batteries, wherein the negative electrode comprises active cadmium compounds (cadmium metal and/or cadmium oxide [hydroxide] depending upon the state of charge of the battery), it has been proposed to create a discharge reserve in the negative electrode by incorporating metallic cadmium or copper, or both, in a cadmium oxide electrode before sealing the battery. Cadmium oxide and cadmium hydroxide are considered as being equivalents for the purposes of this invention.

One serious disadvantage of the use of copper resides in the fact that the copper potential is lower (less negative) than that of the cadmium, so the potential drops greatly once the cadmium is used up. Cadmium works satisfactorily, but incorporating cadmium metal in the negative electrode is substantially more expensive than incorporating zinc metal in the negative electrode in accordance with the present invention.

Accordingly, the object of the present invention is to provide a storage battery with a negative electrode having a discharge reserve, in which the mentioned potential drop does not occur near the end of the discharge period, and so that the potential level of the negative electrode remains at the cadmium voltage or higher during the entire discharge. A cell can be built by this method which exhibits exactly the same voltage characteristics as those of a nickel cadmium cell which has its negative discharge reserve included by some other more complex or more expensive way, e.g., by incorporating cadmium or copper in the negative cadmium oxide electrode or by employing the selective electrolytic treatments of the negative electrode as mentioned above.

This problem of establishing an initial electrical imbalance (discharge reserve in the negative electrode) is solved according to the present invention by incorporating in a cadmium oxide negative electrode, metallic zinc, in an amount equal to at least 5% by equivalent weight of the charge accepting capacity of the cadmium oxide, equivalency being measured in ampere hours. In view of the fact that one would normally expect such use of metallic zinc in the negative electrode to present gassing problems, it was unexpected that no gassing problems arose. In fact, even the use of large amounts (e.g., 50%) of zinc presented no gassing problems.

The zinc can be admixed with this cadmium oxide of the negative electrode, for instance in the form of a powder, granules or chips, or can be otherwise associated with the electrode. It is likewise possible to add to the electrode, instead of substantially pure zinc, a zinc-cadmium alloy, also in any desired form.

Once this electrode is included in the sealed cell, the zinc reduces cadmium oxide to metal in an amount equal in capacity to the zinc added to the electrode, and the zinc itself goes to oxide. Upon subsequent charging of the cell, the negative electrode may or may not reach a high enough state of charge again to reduce the zinc oxide to metal, depending upon how much zinc is used, and upon the ratios of total negative to total positive capacity. (Sealed cells ordinarily have a considerable amount of cadmium oxide which is never charged.) In any case, the negative electrode will always have more charged capacity than the positive, that is, an electrical imbalance in favor of the negative electrode. In this way, when the cell is discharged, the positive electrode will expire before the negative electrode. If antipolar material, such as cadmium oxide is present in the positive electrode, the cadmium oxide will be reduced to cadmium metal before the negative electrode expires. When the negative electrode finally does expire and begins to evolve oxygen, this oxygen will immediately recombine with the cadmium which prior thereto had formed on the positive electrode.

In a further modification of the invention, the zinc can be lodged in the negative electrode, or in particular parts of the electrode. It can even be spacially separated from the electrode, but electrically connected therewith by a conductor. In this case it can be in the form of a sheet or a rod, for example. In a preferred modification of the invention, the metallic zinc is added to the negative electrode in the form of the mentioned granules. In this manner it is easy to obtain the correct proportion of the zinc, and at the same time its good admixture with the cadmium of the active material is ensured.

It is also contemplated to deposit the zinc electrolytically upon the negative electrode. This procedure is to be used preferably with sintered electrodes, in which the grid, being inherently resistant to the electrolyte, is immersed in the solution of cadmium salt and zinc salt, whereupon the zinc can be deposited simultaneously with the cadmium.

It is further contemplated to deposit the zinc in the form of the hydroxide chemically from a salt solution, and then reduce said hydroxide electrochemically to the metal. Finally, the zinc can be deposited without cementation from a solution of a zinc salt by means of a non-noble metal, higher in the electro-motive series, for example, magnesium or aluminum.

Any suitable method, including those described above, can be used to incorporate zinc metal into the cadmium oxide negative electrode employed according to this invention.

It has been found to be necessary to keep the proportion of zinc above 5%, advantageously within 10–50%, and preferably about 20%, of the capacity as measured in ampere-hours, of the cadmium phase of the negative electrode.

It is particularly advantageous to provide the discharge reserve of the negative electrode through the addition of zinc when the positive electrode of a hermetically sealed storage battery contains a so-called antipolar material, that is, the material which is normally used in the negative electrode as the active material, e.g., cadmium oxide. In this case, as already described above, the discharge reserve of the negative electrode has the advantage that in the event of a deep discharge with reversal of polarity, such antipolar material in the positive electrode, present therein in the form of cadmium oxide or hydroxide, is partly reduced to cadmium prior to the inception of the evolution of oxygen in the negative electrode, thus chemically consuming the oxygen as soon as it is generated on the negative electrode.

I claim:

1. In the process of manufacturing a storage battery of the permanently hermetically sealed alkaline type in which the storage battery contains a negative electrode comprising cadmium oxide, the improvement which comprises incorporating in the negative electrode, prior to assembling and sealing the battery, cadmium oxide and a quantity of metallic zinc which is in an amount equal to at least 5% by equivalent weight of the charge accepting capacity of said cadmium oxide, equivalency being measured in ampere-hours.

2. The process of claim 1 in which the zinc is present in the proportion of from approximately 10% to 50% by equivalent weight of the capacity of said cadmium oxide, equivalancy being measured in ampere-hours.

3. The process of claim 1 in which the zinc is approximately 20% by equivalent weight of the capacity of the cadmium oxide of said electrode, equivalency being measured in ampere-hours.

4. In the process of manufacturing a storage battery of the permanently hermetically sealed alkaline type in which the storage battery contains a negative electrode comprising cadmium oxide, and in which the positive electrode contains antipolar material, the improvement which comprises incorporating in the negative electrode, prior to assembling and sealing the battery, cadmium oxide and a quantity of metallic zinc which is in an amount equal to at least 5% by equivalent weight of the charge accepting capacity of said cadmium oxide, equivalency being measured in ampere-hours.

5. The process of claim 4 in which the antipolar material is cadmium oxide.

6. A sealed storage battery comprising a positive electrode, an alkaline electrolyte, and a negative electrode containing cadmium oxide, metallic cadmium and zinc oxide, said zinc oxide being in an amount of at least 5% by equivalent weight of the charge-accepting capacity of said negative electrode, equivalency being measured in ampere hours, said metallic cadmium being in an amount which is in excess of the electrochemically equivalent amount of charged material in the positive electrode, said excess of metallic cadmium being electrochemically equivalent to the amount of said zinc oxide.

7. The sealed storage battery of claim 6 in which the zinc oxide is present in an amount of from approximately 10% to 50% by equivalent weight of the charge-accepting capacity of the negative electrode, equivalency being measured in ampere hours.

8. The sealed storage battery of claim 6 in which the zinc oxide is approximately 20% by equivalent weight of the charge-accepting capacity of the negative electrode, equivalency being measured in ampere hours.

9. The sealed storage battery of claim 6 in which the positive electrode contains antipolar material.

10. The sealed storage battery of claim 9 in which the antipolar material is cadmium oxide.

11. An uncharged sealed storage battery comprising an uncharged positive electrode, an alkaline electrolyte, and a negative electrode containing cadmium oxide, metallic cadmium and zinc oxide, said zinc oxide being in an amount of at least 5% by equivalent weight of the charge-accepting capacity of said negative electrode, equivalency being measured in ampere hours, the amount of zinc oxide being chemically equivalent to the amount of metallic cadmium.

References Cited by the Examiner

UNITED STATES PATENTS 2,915,576  12/59  Strauss _____ 136—31 X
2,934,581  4/60   Dassler _____ 136—28 X JOHN H. MACK, *Primary Examiner.*